(12) United States Patent
Li et al.

(10) Patent No.: US 12,171,394 B2
(45) Date of Patent: Dec. 24, 2024

(54) DIRT COLLECTING BOX ASSEMBLY, MAINTENANCE STATION AND CLEANING SYSTEM

(71) Applicant: SHENZHEN SILVER STAR INTELLIGENT GROUP CO., LTD., Shenzhen (CN)

(72) Inventors: Jun Li, Shenzhen (CN); Linlin Zhou, Shenzhen (CN)

(73) Assignee: SHENZHEN SILVER STAR INTELLIGENT GROUP CO., LTD., Shenzhen (CN)

( * ) Notice: Subject to any disclaimer, the term of this patent is extended or adjusted under 35 U.S.C. 154(b) by 346 days.

(21) Appl. No.: 17/699,402

(22) Filed: Mar. 21, 2022

(65) Prior Publication Data

US 2022/0369880 A1 Nov. 24, 2022

(30) Foreign Application Priority Data

May 21, 2021 (CN) .......................... 202110559805.X (51) Int. Cl.
*A47L 9/16* (2006.01)
*A47L 11/40* (2006.01)
*B01D 45/16* (2006.01)

(52) U.S. Cl.
CPC .......... *A47L 9/1683* (2013.01); *A47L 9/1641* (2013.01); *A47L 9/165* (2013.01); *A47L 9/1658* (2013.01); *A47L 11/4016* (2013.01); *A47L 11/4027* (2013.01); *B01D 45/16* (2013.01); *A47L 2201/024* (2013.01)

(58) Field of Classification Search
CPC ........ A47L 9/168; A47L 9/1641; A47L 9/165; A47L 9/16; A47L 9/58; A47L 11/4016; A47L 11/4027; B01D 45/16

USPC .......................................................... 55/429
See application file for complete search history.

(56) References Cited

U.S. PATENT DOCUMENTS

2022/0287537 A1* 9/2022 Wang ..................... B01D 50/20

FOREIGN PATENT DOCUMENTS

| CN | 202477553 U | * 10/2012 |
| CN | 205286244 U | 6/2016 |
| CN | 111345737 A | 6/2020 |
| CN | 211299790 U | 8/2020 |

(Continued)

OTHER PUBLICATIONS

International Search Report of PCT Patent Application No. PCT/CN2021/135565 issued on Mar. 9, 2022.

*Primary Examiner* — Robert A Hopkins
*Assistant Examiner* — Qianping He
(74) *Attorney, Agent, or Firm* — Samson G. Yu (57) ABSTRACT

A dirt collecting box assembly includes a dirt collecting box and a separating device. The dirt collecting box defines a dirt inlet, an air outlet, and a cavity, and the cavity communicates between the dirt inlet and the air outlet. The separating device is installed in the cavity of the dirt collecting box and is close to a top of the cavity. The separating device communicates between the dirt inlet and the air outlet. The air outlet communicates a fan assembly, and the fan assembly is configured to generate negative pressure through the air outlet, such that waste water enters the separating device via the dirt inlet under the negative pressure, and enters the cavity of the dirt collecting box after solid-liquid separation of the separating device.

17 Claims, 10 Drawing Sheets

(56) References Cited

FOREIGN PATENT DOCUMENTS

| CN | 111973091 | A  | 11/2020 |
|----|-----------|----|---------|
| CN | 112568834 | A  | 3/2021  |
| CN | 112869650 | A  | 6/2021  |
| CN | 215078126 | U  | 12/2021 |
| FR | 2844697   | A1 | 3/2004  |

* cited by examiner

DIRT COLLECTING BOX ASSEMBLY, MAINTENANCE STATION AND CLEANING SYSTEM

CROSS-REFERENCE TO RELATED APPLICATIONS

The present disclosure claims priority of Chinese Patent Application No. 202110559805. X, filed on May 21, 2021, titled "DIRT COLLECTING BOX ASSEMBLY, MAINTENANCE STATION AND CLEANING SYSTEM", the contents of which are incorporated herein by reference.

TECHNICAL FIELD

The present disclosure relates to the field of cleaning equipments, and in particular, relates to a dirt collecting box assembly, a maintenance station and a cleaning system.

BACKGROUND

With the development of economy and improvement of living standard, various cleaning robots, such as sweeping robots, washing robots or window cleaning robots, have been widely used in household cleaning tasks. In some cases, a maintenance station may be used to clean and maintain the cleaning robot, and the maintenance station is equipped with a dirt collecting box assembly. However, the cleaning and maintenance process may involve the complex situation where solid trash and liquid are mixed at the same time, and the mixture of solid trash and liquid left on the maintenance station is likely to generate unpleasant smell and pollution. The current dirt collecting box assembly lacks a reasonable structural design to dispose of solid trash and liquid at the same time, which brings great difficulties to users for later maintenance.

SUMMARY

An embodiment of the present disclosure provides a dirt collecting box assembly. The dirt collecting box assembly includes a dirt collecting box and a separating device. The dirt collecting box defines a dirt inlet, an air outlet, and a cavity, and the cavity communicates between the dirt inlet and the air outlet. The separating device is installed in the cavity of the dirt collecting box and close to a top of the cavity. The separating device communicates between the dirt inlet and the air outlet. The air outlet communicates a fan assembly, and the fan assembly is configured to generate negative pressure through the air outlet, such that waste water enters the separating device via the dirt inlet under the negative pressure, and enters the cavity of the dirt collecting box after solid-liquid separation of the separating device.

Another embodiment of the present disclosure provides a maintenance station for maintaining a cleaning equipment. The maintenance station includes a station body, a dirt inlet pipe, a fan assembly, and the above-mentioned dirt collecting box assembly. The dirt collecting box is detachably installed on the station body, the dirt inlet pipe is installed on the station body and communicated with the dirt inlet, and the fan assembly is installed on the station body and communicated with the air outlet.

Still another embodiment of the present disclosure provides a cleaning system. The cleaning system includes a cleaning equipment and the above-mentioned maintenance station. The maintenance station is configured to maintain the cleaning equipment.

BRIEF DESCRIPTION OF THE DRAWINGS

One or more embodiments are illustrated by pictures in the corresponding attached drawings, which do not constitute limitation on the embodiments. Components with the same reference numerals in the attached drawings are shown as similar components, and the pictures in the attached drawings do not constitute scale limitation unless otherwise specifically stated.

DETAILED DESCRIPTION

In order to make purposes, technical solutions and advantages of the present disclosure more clear, the present disclosure will be further described in detail below with reference to the attached drawings and embodiments. It shall be appreciated that, the specific embodiments described here are only used to explain the present disclosure, and are not used to limit the present disclosure. Based on the embodiments in the present disclosure, all other embodiments obtained by those of ordinary skill in the art without creative labor are within the claimed scope of the present disclosure.

It shall be noted that, features in the embodiments of the present disclosure may be combined with each other without conflict, and all of them are within the claimed scope of the present disclosure. In addition, although functional modules are divided in the schematic view of the device and logical sequences are shown in the flowchart diagram, in some cases, steps shown or described may be executed in a manner different from the module division in the device or in a sequence different from that in the flowchart diagram. Furthermore, words "first", "second" and "third" used in the present disclosure do not limit the data and execution order, but only distinguish the same or similar items with basically the same functions and effects.

Figure 1:
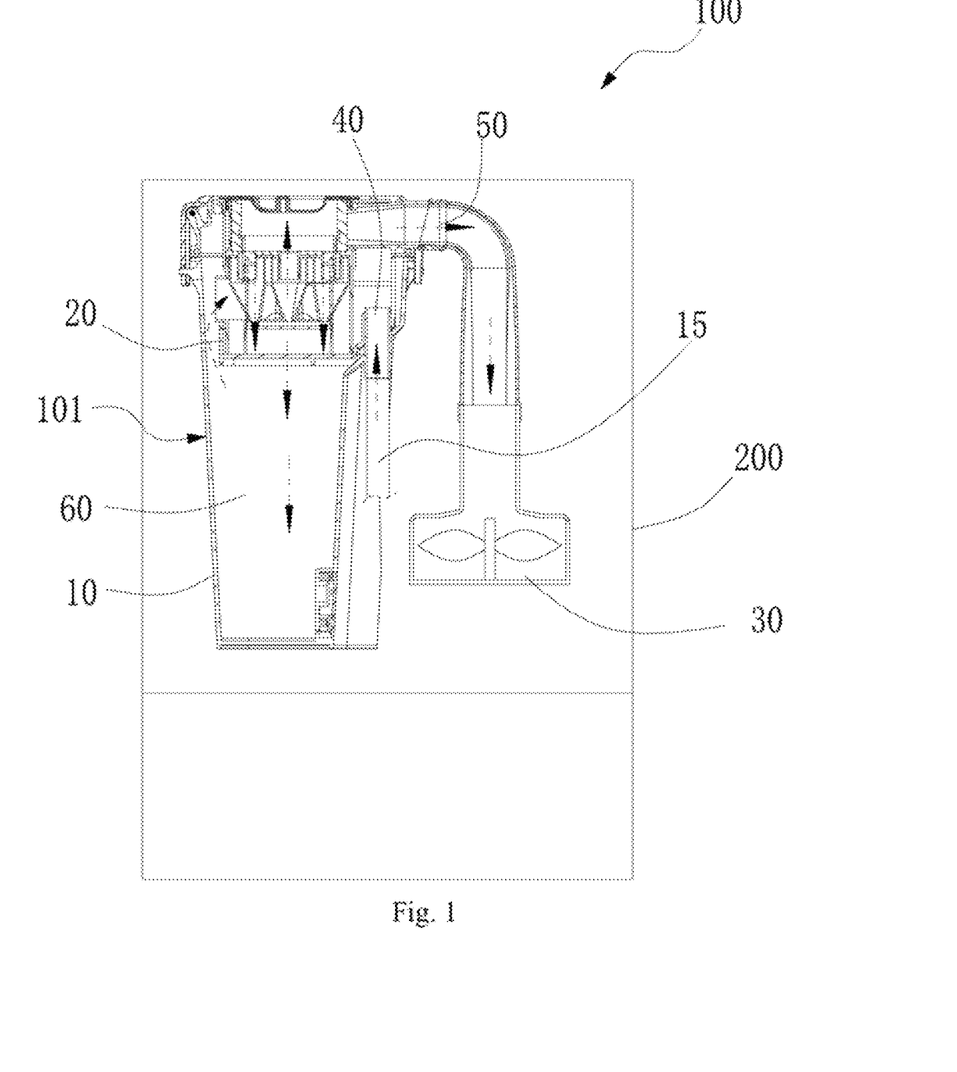
FIG. 1 is a schematic structural view of a maintenance station provided by an embodiment of the present disclosure.

Referring to FIG. 1, an embodiment of the present disclosure provides a maintenance station 100, and the maintenance station 100 is configured to maintain a cleaning equipment. The maintenance station 100 includes a station body 200, a dirt inlet pipe 15, a fan assembly 30, and a dirt collecting box assembly 101.

The dirt collecting box assembly 101 includes a dirt collecting box 10 and a separating device 20, the dirt collecting box 10 defines a dirt inlet 40, an air outlet 50 and a cavity 60, and the cavity 60 is communicated between the dirt inlet 40 and the air outlet 50. The separating device 20 is installed in the cavity 60 of the dirt collecting box 10 close to the top of the dirt collecting box 10, the separating device 20 is communicated between the dirt inlet 40 and the air outlet 50, the air outlet 50 is configured to communicate the fan assembly 30, and the fan assembly 30 is configured to generate a negative pressure through the air outlet 50, such that waste water enters the separating device 20 through the dirt inlet 40 under the negative pressure, and enters the cavity 60 of the dirt collecting box 10 after solid-liquid separation of the separating device 20.

The dirt collecting box 10 is detachably installed on the station body 200, the dirt inlet pipe 15 is installed on the station body 200 and communicated with the dirt inlet 40, and the fan assembly 30 is installed on the station body 200 and communicated with the air outlet 50.

In the above-mentioned maintenance station 100, the separating device 20 is installed in the cavity 60 of the dirt collecting box 10 and is close to the top of the cavity 10, the separating device 20 is communicated between the dirt inlet 40 and the air outlet 50, the fan assembly 30 is pneumatically communicated with the air outlet 50, the fan assembly 30 is configured to generate a negative pressure, and the fan assembly 30 may generate a strong suction, such that waste water enters the separating device 20 through the dirt inlet 40 under the negative pressure and enters the dirt collecting box 10 after solid-liquid separation of the separating device 20. The separating device 20 may function to separate solid trash, thus avoiding the problems of unpleasant smell and pollution caused by the mixing of solid trash and liquid in the dirt collecting box 10, and realizing the effect of the dirt collecting box assembly 101 for collecting solid trash and waste water separately. Moreover, the separating device 20 does not need to occupy the space outside the dirt collecting box 10, which facilitates the miniaturization of the maintenance station 100.

The station body 200 may bear the weight of the dirt collecting box 10, and the dirt collecting box 10 is detachably installed on the station body 200. For example, the station body 200 defines an installation cavity, and the dirt collecting box 10 is detachably installed in the installation cavity of the station body 200. The dirt inlet pipe 15 is communicated with the dirt inlet 40 of the dirt collecting box 10, and is configured to suck waste water or trash under the negative-pressure suction of the fan assembly 30.

In some embodiments, the maintenance station 100 may directly suck the waste water collected by the cleaning robot into the dirt collecting box 10 through the dirt inlet pipe 15. In this embodiment, one end of the dirt inlet pipe 15 away from the dirt collecting box 10 forms a connecting part, the connecting part is configured to connect with the cleaning robot. The cleaning robot includes a dirt collecting container and a butting valve which is pneumatically communicated with the dirt collecting container. When the cleaning robot moves close to the maintenance station 100, the butting valve of the cleaning robot may be butted and communicated with the connecting part of the dirt inlet pipe 15, so as to establish a fluid channel communicating the dirt collecting container and the dirt collecting box 10. The fan assembly 30 may drive the fluid in the dirt collecting container to transfer into the dirt collecting box 10 through the fluid channel under the negative pressure.

In another embodiment, the maintenance station 100 may provide cleaning liquid to clean and maintain the cleaning robot, waste water may be generated in the cleaning and maintenance process, and the maintenance station 100 may suck the aforesaid waste water into the dirt collecting box 10 through the dirt inlet pipe 15. In this embodiment, the station body 200 includes a dirt collecting tank configured to receive waste water generated during the cleaning and maintenance of the cleaning robot, and one end of the dirt inlet pipe 15 is communicated with the dirt collecting tank, and the other end of the dirt inlet pipe 15 is communicated with the dirt collecting box 10. The fan assembly 30 may drive the fluid in the dirt collecting tank to transfer into the dirt collecting box 10 through the dirt inlet pipe 15 under the negative pressure.

The fan assembly 30 includes a fan and an air guide channel, one end of the air guide channel is pneumatically communicated with the separating device 20, and the other end of the air guide channel is positioned away from the separating device 20. The fan is installed in the air guide channel and may generate a negative pressure in the air guide channel to suck waste water into the separating device 20.

The separating device 20 is installed at the top of the dirt collecting box 10, such that the separating device 20 is at a relatively higher position, and the liquid storage cavity of the dirt collecting box 10 is at a relatively lower position, and the liquid treated by the separating device 20 may automatically flow into the liquid storage cavity of the dirt collecting box 10 under the action of its own gravity.

Referring to FIG. 1, FIG. 2, FIG. 3, FIG. 4 and FIG. 5, the separating device 20 includes a dirt storage container 21, and the dirt storage container 21 is communicated with the dirt inlet 40. The dirt storage container 21 includes an air outlet side 211 and a sieve 212 positioned on the air outlet side 211. The dirt storage container 21 is communicated with the cavity 60 and the air outlet 50 through the air outlet side 211. The dirt storage container 21 is accommodated in the cavity 60 of the dirt collecting box 10, which is conducive to the miniaturization of the maintenance station 100.

When the fan assembly 30 works to generate negative-pressure suction, the waste water may first enter the dirt storage container 21 from the dirt inlet 40 under the negative pressure, and the waste water may flow through the air outlet side 211 with the gas in the dirt storage container 21. The sieve 212 on the air outlet side 211 filters the waste water, such that the solid trash in the waste water cannot pass through the air outlet side 211 and thus is separated in the dirt storage container 21. That is, the dirt storage container 21 may have the function of collecting the solid trash in the waste water. In addition, the waste water passing through the air outlet side 211 falls to the bottom of the cavity 60 under the action of its own gravity, which may prevent the waste water from being attracted by the suction of the fan assembly 30 and entering the fan assembly 30, thereby preventing the fan assembly 30 from being damaged due to moisture.

The dirt storage container 21 is detachably installed on the dirt collecting box 10. When the solid trash in the dirt storage container 21 reaches a certain capacity, the user may disassemble the dirt storage container 21 from the dirt collecting box 10, such that it is convenient to clean up the solid trash in the dirt storage container 21.

The shape of the dirt storage container 21 is not limited here. The dirt storage container 21 may be any of square, cylindrical and special shapes, and those skilled in the art may set the shape on their own according to actual needs.

The air outlet side 211 is approximately plate-shaped, and for example, the air outlet side 211 may have a shape of any of a flat plate shape, a curved plate shape and a special plate shape. The sieve 212 on the air outlet side 211 may be any of a metal sieve, a plastic sieve, and a Hepa and the like.

In some embodiments, the air outlet side 211 may be arranged opposite to the sidewall of the dirt collecting box 10. In other embodiments, the air outlet side 211 may also be arranged opposite to the bottom wall of the dirt collecting box 10. Those skilled in the art may set the air outlet side 211 on their own according to actual needs.

Figure 2:
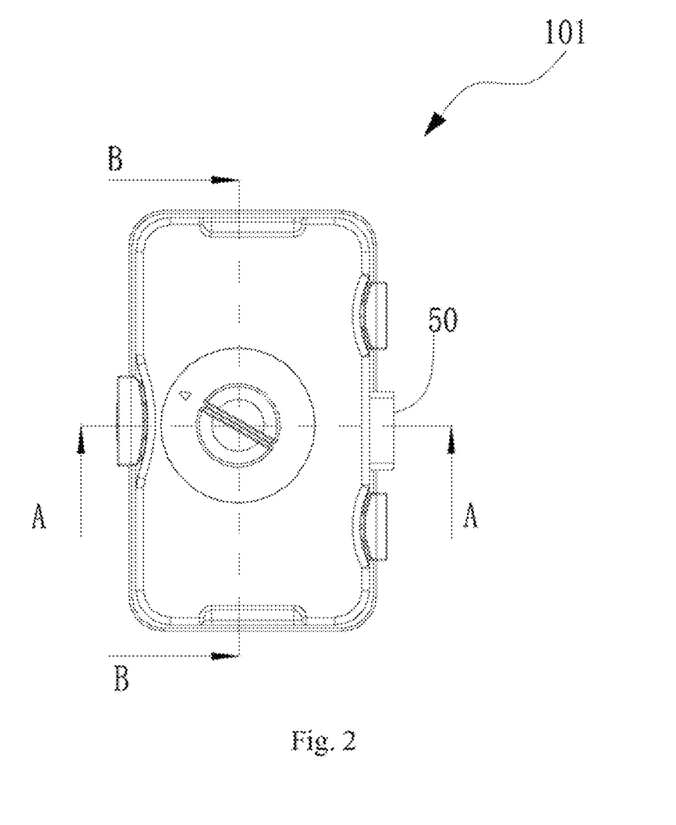
FIG. 2 is a schematic top view of a dirt collecting box assembly provided by an embodiment of the present disclosure.
Figure 5:
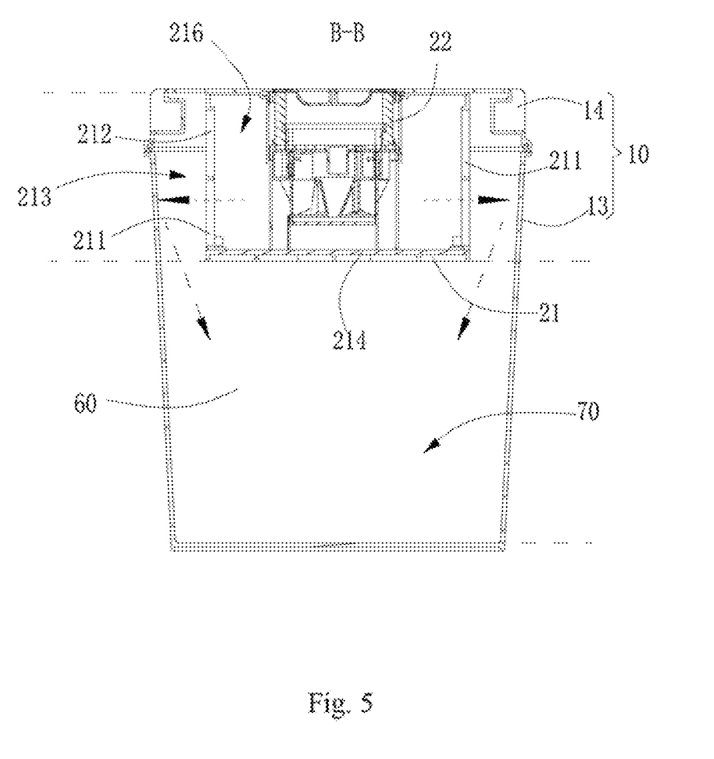
FIG. 5 is a schematic cross-sectional view at B-B in FIG. 2.

Referring to FIG. 1, FIG. 2 and FIG. 5, in some embodiments, a liquid storage space 70 is defined between the bottom of the dirt storage container 21 and the bottom of the dirt collecting box 10, and the air outlet side 211 and the sidewall of the dirt collecting box 10 are opposite to each other and arranged at an interval, such that an air outlet channel 213 communicated with the liquid storage space 70 is defined between the air outlet side 211 and the sidewall of the dirt collecting box 10.

In this embodiment, the liquid storage space 70 is located below the dirt storage container 21, that is, the liquid storage space 70 is at a lower position relative to the dirt storage container 21. When the fan assembly 30 works normally to generate negative-pressure suction, the waste water and gas in the dirt storage container 21 pass through the air outlet side 211 under the negative pressure. The waste water flows directly downwards into the liquid storage space 70 under the action of its own gravity, while the gas continues to flow to the air outlet channel 213 under the negative pressure, so as to realize the separation of waste water and gas, prevent the waste water from continuing to flow to the air duct structure 22 under the negative pressure, and further prevent the fan assembly 30 from being damaged due to moisture.

The air outlet side 211 substantially extends in the height direction of the dirt collecting box 10, and the air outlet channel 213 generally extends in the height direction of the dirt collecting box 10. The interval distance between the air outlet side 211 and the sidewall of the dirt collecting box 10 meets a preset distance threshold, the preset distance threshold may be 10 mm to 50 mm. Of course, in other embodiments, those skilled in the art may also set the preset distance threshold on their own according to actual needs.

Because the air outlet side 211 is opposite to the sidewall of the dirt collecting box 10 and the distance therebetween is relatively small, the air outlet direction of the air outlet side 211 faces the sidewall of the dirt collecting box 10, and the sidewall of the dirt collecting box 10 can buffer and decelerate the airflow flowing out from the air outlet side 211, thereby effectively avoiding the situation where the wet waste blocks the sieve 212 and causes failure of solid-liquid separation, and meanwhile helping to reduce the noise. The air outlet side 211 has a relatively larger air outlet area, and the way of sucking the waste water out laterally from the dirt storage container 21 through the air outlet side 211 is also helpful to avoid the situation where the wet waste blocks the sieve 212 and causes failure of solid-liquid separation.

Referring to FIG. 1, FIG. 2 and FIG. 5, further, the dirt storage container 21 includes two of the air outlet sides 211 oppositely arranged, the two air outlet sides 211 are respectively adjacent to two opposite sidewalls of the dirt collecting box 10, so as to correspondingly form two air outlet channels 213, and the dirt inlet 40 is located between the two air outlet sides 211. In this embodiment, the arrangement of the two air outlet sides 211 makes the dirt storage container 21 have a larger air outlet area. When the fan assembly 30 works to generate negative-pressure suction, the gas in the dirt storage container 21 forms two airflows under the negative pressure which respectively pass through the two air outlet sides 211, and this may disperse the solid trash in two directions and helps to avoid the situation where the wet waste blocks the sieve 212 and causes failure of solid-liquid separation. At the same time, two waste waters may be dispersed in two directions and respectively pass through the two air outlet sides 211, which is also helpful to realize the function of quickly discharging the water to the cavity 60.

Referring to FIG. 1, FIG. 2, FIG. 4 and FIG. 5, further, the dirt storage container 21 further includes a guide bottom plate 214 arranged in the horizontal direction. The guide bottom plate 214 and the bottom of the dirt collecting box 10 are opposite to each other and arranged at an interval, and a liquid storage space 70 is defined between the guide bottom plate 214 and the bottom of the dirt collecting box 10. The air outlet side 211 is connected to the edge of the guide bottom plate 214, and the guide bottom plate 214 is configured to guide the waste water and gas to flow to the air outlet side 211.

In this embodiment, the guide bottom plate 214 is spread in the horizontal direction, and the guide bottom plate 214 has a relatively larger spread area and thus may bear more solid trash in the direction of gravity. The guide bottom plate 214 may function to separate the liquid storage space 70 from the inner cavity of the dirt storage container 21. The guide bottom plate 214 may bear a large amount of solid trash and is unlikely to cause the problem that the trash blocks the sieve 212, which is convenient for users to clean up the solid trash in the dirt storage container 21. When the fan assembly 30 works to generate negative pressure suction, the waste water and the solid trash in the dirt storage container 21 may move toward the air outlet side 211 along the guide bottom plate 214, and the guide bottom plate 214 is capable of rubbing and blocking the solid wet trash to a certain extent, thereby blocking a large amount of solid wet trash from rapidly impacting the sieve 212 of the air outlet side 211 along with the waste water, and helping to avoid the situation where the wet waste blocks the sieve 212 and causes failure of solid-liquid separation.

Referring to FIG. 1, FIG. 2, FIG. 4 and FIG. 5, further, the dirt storage container 21 further includes two guide side plates 215 oppositely arranged, the two guide side plates 215 are respectively adjacent to the two opposite sidewalls of the dirt collecting box 10, the air outlet side 211 is connected to sides of the two guide side plates 215, and the two guide side plates 215 guide waste water and air flow to the air outlet side 211.

In this embodiment, the guide bottom plate 214 is connected with the two guide side plates 215, and there may be many ways to connect the guide bottom plate 214 with the two guide side plates 215. For example, the guide bottom plate 214 may be integrally formed with the two guide side plates 215 through injection molding, or the guide bottom plate 214 may be detachably connected with the two guide side plates 215 through a snap structure, or the guide bottom plate 214 may be fixedly connected with the two guide side plates 215 via screws. This is not limited here, and those skilled in the art may set the connection on their own according to actual needs.

Referring to FIG. 1, FIG. 2, FIG. 4 and FIG. 5, further, the dirt collecting box 10 includes a box body 13 and a box cover 14, the box cover 14 covers the box body 13, the box cover 14 and the box body 13 cooperatively define the cavity 60, the dirt storage container 21 is connected to the box cover 14, the dirt storage container 21 and the box cover 14 cooperatively define a dirt storage cavity 216, the dirt storage cavity 216 is communicated with the cavity 60 through the air outlet side 211, and the air duct structure 22 is installed in the dirt storage cavity 216.

In this embodiment, the box body 13 is a container with an open end, and the box cover 14 covers the open end of the box body 13, such that the box cover 14 and the box body 13 cooperatively define the cavity 60. A sealing ring 102 is arranged between the box cover 14 and the box body 13, such that the box cover 14 and the box body 13 are hermetically connected to each other. The box cover 14 may be connected with the box body 13 by any one or a combination of several ways, such as snap connection, screw connection, magnet adsorption or the like. The dirt storage container 21 is a container with an open end. The box cover 14 covers the open end of the dirt storage container 21, such that the dirt storage container 21 and the box cover 14 cooperatively define the dirt storage cavity 216. The dirt storage container 21 may be connected with the box cover 14 by any one or a combination of several ways, such as snap connection, screw connection, magnet adsorption or the like. In other embodiments, the dirt storage container 21 may also be an enclosed container structure. In other embodiments, the dirt storage container 21 may also be integrally arranged with the box cover 14, and for example, the dirt storage container 21 may be integrally formed with the box cover 14 through injection molding.

When the box cover 14 is detached from the box body 13, the dirt storage container 21 may be detached from the box body 13 together with the box cover 14, such that it is convenient to clean up the waste collected by the dirt storage container 21 and it is also convenient to clean up the waste water in the box body 13.

In some embodiments, the dirt storage container 21 or the box cover 14 may include a movable cover plate thereon, and the dirt storage cavity 216 of the dirt storage container 21 may be opened by opening the movable cover plate so as to facilitate cleaning of the dirt storage cavity 216 of the dirt storage container 21, and the dirt storage cavity 216 of the dirt storage container 21 may be closed by closing the movable cover plate.

In some other embodiments, the dirt storage cavity 216 of the dirt storage container 21 may also be opened by disassembling the open end of the dirt storage container 21 from the box cover 14.

Figure 3:
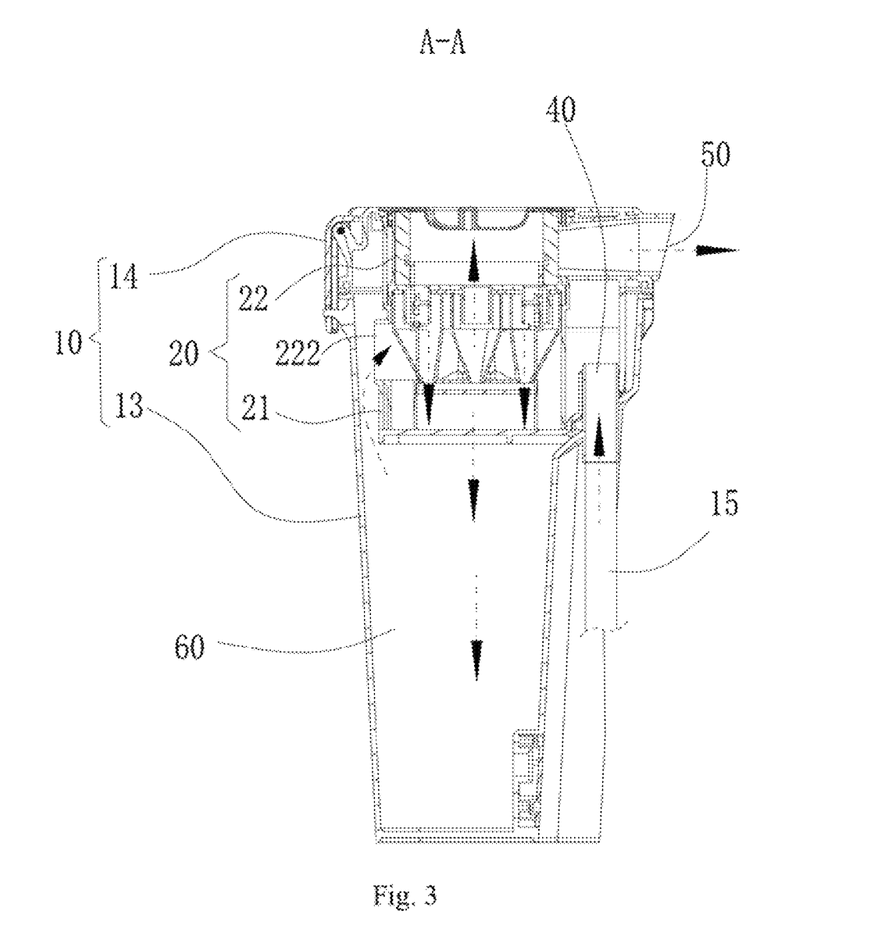
FIG. 3 is a schematic cross-sectional view at A-A in FIG. 2.
Figure 4:
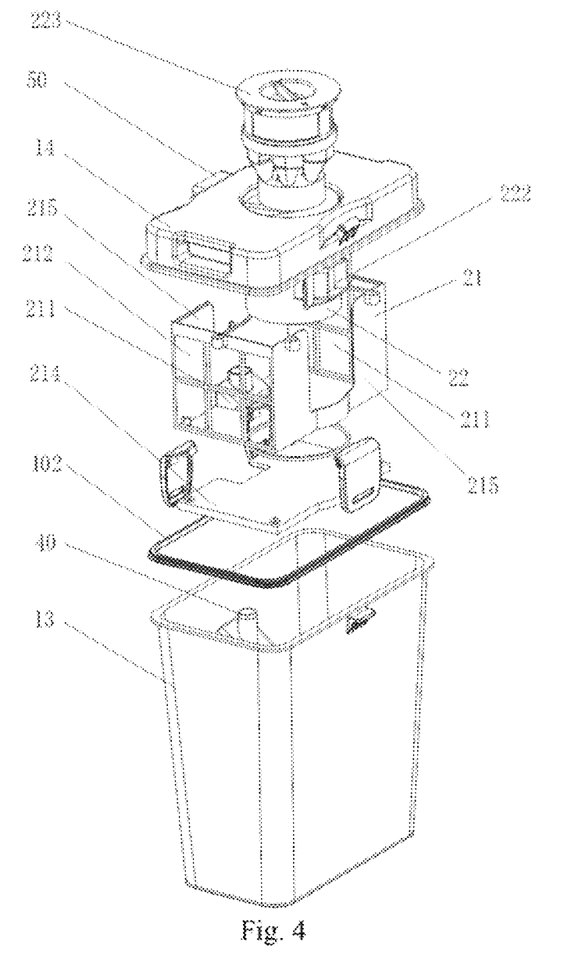
FIG. 4 is a schematic explosive view of the dirt collecting box assembly provided by the embodiment of the present disclosure.
Figure 6:
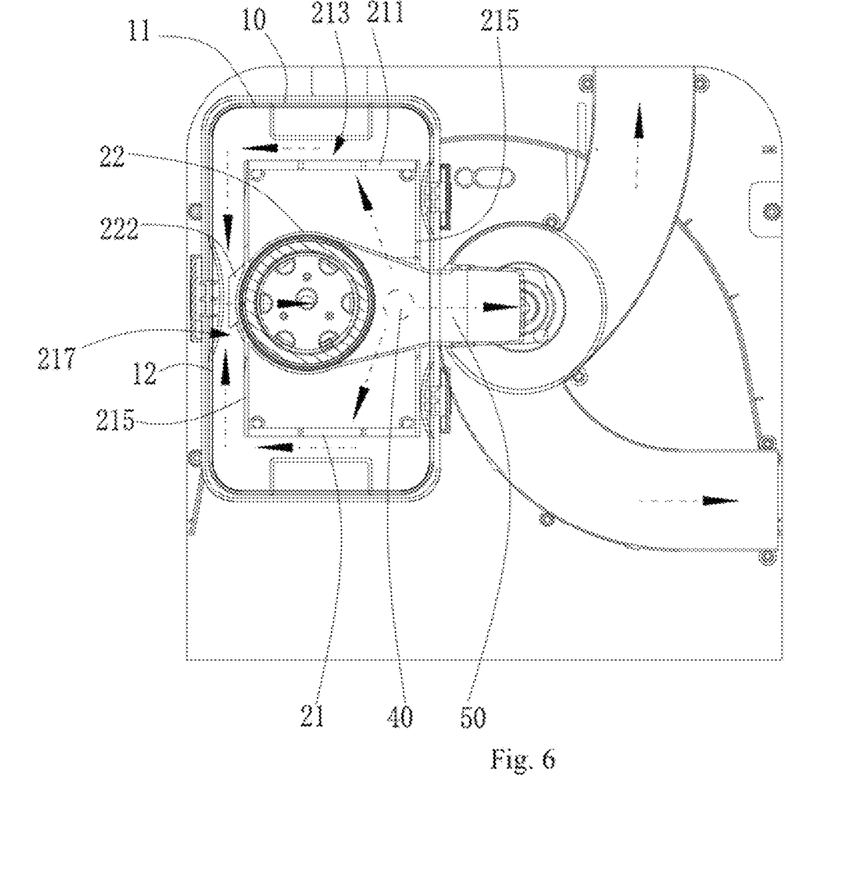
FIG. 6 is a schematic transverse cross-sectional view of the dirt collecting box assembly provided by the embodiment of the present disclosure.

Referring to FIG. 3 and FIG. 6, further, the separating device 20 further includes an air duct structure 22 connected to the dirt storage container 21, one end of the air duct structure 22 is communicated with the air outlet 50, another end of the air duct structure 22 that is away from the air outlet 50 includes an air inlet side 222, and the air duct structure 22 is communicated with the cavity 60 through the air inlet side 222.

In this embodiment, the air duct structure 22 is accommodated in the dirt storage container 21, such that the air duct structure 22 may be arranged by utilizing the space of the inner cavity of the dirt storage container 21. In this way, the overall structure composed of the air duct structure 22 and the dirt storage container 21 is compact, and the space occupied in the dirt collecting box 10 is minimized, such that the dirt collecting box 10 may retain enough remaining space for storing waste water. In other embodiments, the air duct structure 22 is partially accommodated in the dirt storage container 21, and the air duct structure 22 is arranged with a part thereof extending out of the dirt storage container 21. Alternatively, the air duct structure 22 is located outside the dirt storage container 21, or the air duct structure 22 is accommodated in the cavity between the dirt storage container 21 and the dirt collecting box 10.

In this embodiment, since one end of the air duct structure 22 away from the fan assembly 30 includes the air inlet side 222, the air duct structure 22 is communicated with the cavity 60 through the air inlet side 222, and the dirt storage container 21 is communicated with the cavity 60 through the air outlet side 211, and thus the dirt inlet 40, the dirt storage container 21, the cavity 60 and the air duct structure 22 are sequentially communicated to form an extended flow path. In other embodiments, the separating device 20 may also not be provided with the air duct structure 22. The air guide channel of the fan assembly 30 is directly communicated with the enclosed cavity 60.

When the fan assembly 30 works to generate negative-pressure suction, the gas in the dirt storage container 21 may be finally discharged to the external environment through the aforesaid extended flow path under the negative pressure. On the other hand, after passing through the air outlet side 211 under the negative pressure, the gas in the dirt storage container 21 still flows to the air inlet side 222 of the air duct structure 22 after passing through the cavity 60 for a short time. As compared to the way in which the fan assembly 30 directly sucks the gas in the dirt storage container 21, the path length of the aforesaid extended flow path is relatively long, which is beneficial for improving the dehumidification effect of the gas sucked and preventing the fan assembly 30 from being damaged due to moisture.

In some embodiments, the air duct structure 22 is integrally arranged with the box cover 14 of the dirt collecting box 10. For example, the air duct structure 22 is integrally formed with the box cover 14 of the dirt collecting box 10 through injection molding, or the air duct structure 22 is connected with the box cover 14 of the dirt collecting box 10 by thermal welding or the like, which may reduce the number of disassembled parts, simplify the assembly difficulty of products and reduce the manufacturing cost of products. In other embodiments, the air duct structure 22 may also be fixedly connected with the box cover 14 of the dirt collecting box 10 by screw connection, snap connection or riveting or the like.

Referring to FIG. 3, FIG. 5 and FIG. 6, further, the air inlet side 222 and the air outlet side 211 respectively face to different positions of the sidewall of the dirt collecting box 10, and the air inlet side 222 and the sidewall of the dirt collecting box 10 are opposite to each other and arranged at an interval, such that an air inlet channel 217 communicated with the air outlet channel 213 is defined between the air inlet side 222 and the sidewall of the dirt collecting box 10.

In this embodiment, the air duct structure 22 is accommodated in the dirt storage container 21, and the air duct structure 22 spans between two opposite sidewalls of the inner cavity of the dirt storage container 21 in the horizontal direction. Wherein, the air duct structure 22 spans the two guide side plates 215 in the horizontal direction, that is, both ends of the air duct structure 22 respectively abut on the two guide side plates 215, such that the air duct structure 22 may be directly communicated with the liquid storage space 70. In this way, the fan assembly 30 may indirectly generate negative-pressure suction on the dirt storage container 21 through the air duct structure 22 and the liquid storage space 70. Furthermore, since the air outlet channel 213 and the air inlet channel 217 are formed on the peripheral side of the dirt storage container 21, the positions of the air outlet channel 213 and the air inlet channel 217 are higher than the position of the liquid storage space 70, and thus the waste water enters the liquid storage space 70 from the air outlet channel 213 under the action of its own gravity, and the waste water cannot rise to pass through the air inlet channel 217 and enter the air duct structure 22, thereby preventing the fan assembly 30 from moisture.

The air duct structure 22 spans between two opposite sidewalls of the inner cavity of the dirt storage container 21 in the horizontal direction. The air duct structure 22 may be extended for a sufficient length by using the space of the inner cavity of the dirt storage container 21, so as to form the air duct structure 22 with a sufficient length. This helps to increase the length of the aforesaid extended flow path and improve the dehumidification effect of the gas sucked.

Referring to FIG. 3, FIG. 5 and FIG. 6, in some embodiments, the dirt collecting box 10 includes a first sidewall 11 and a second sidewall 12 connected with the first sidewall 11, the first sidewall 11 and the second sidewall 12 are arranged at an included angle therebetween, the air outlet side 211 and the first sidewall 11 are opposite to each other and arranged at an interval, and the air inlet side 222 and the second sidewall 12 are opposite to each other and arranged at an interval. The first sidewall 11 and the second sidewall 12 are arranged at a right angle, or the first sidewall 11 and the second sidewall 12 are arranged at an acute angle, or the first sidewall 11 and the second sidewall 12 are arranged at an obtuse angle, and this is not limited here. The air outlet side 211 is spread relative to the first sidewall 11, such that the air outlet channel 213 is defined between the air outlet side 211 and the first sidewall 11. One of the guide side plates 215 is spread relative to the second sidewall 12, and an interval is set between one of the guide side plates 215 and the second sidewall 12, and the air inlet channel 217 forms a part of the interval. Wherein, the air outlet channel 213 extends along the first sidewall 11, and the air inlet channel 217 extends along the second sidewall 12. The horizontal extension direction of the air outlet channel 213 and the horizontal extension direction of the air inlet channel 217 are arranged at an included angle therebetween, such that after the airflow flows out from the air outlet side 211, the airflow flows to the air inlet channel 217 along the air outlet channel 213 and then flows to the air inlet side 222 along the air inlet channel 217. In this way, the water vapor in the airflow is fully released, which is beneficial for improving the dehumidification effect of the airflow.

Figure 7:
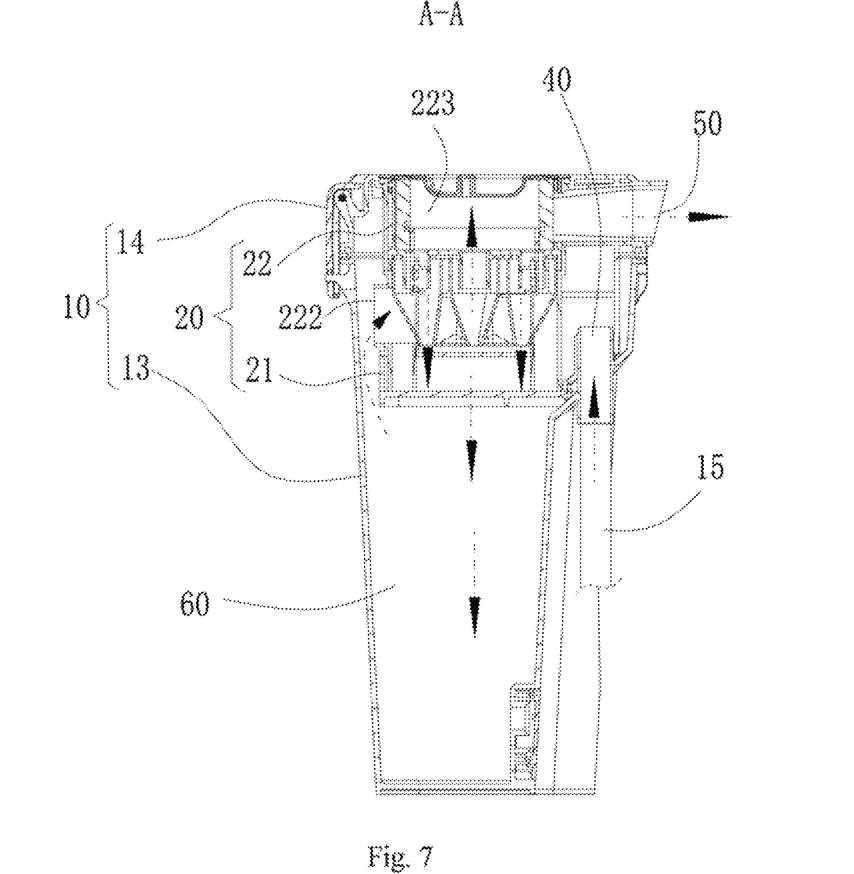
FIG. 7 is another schematic cross-sectional view at A-A in FIG. 2.
Figure 8:
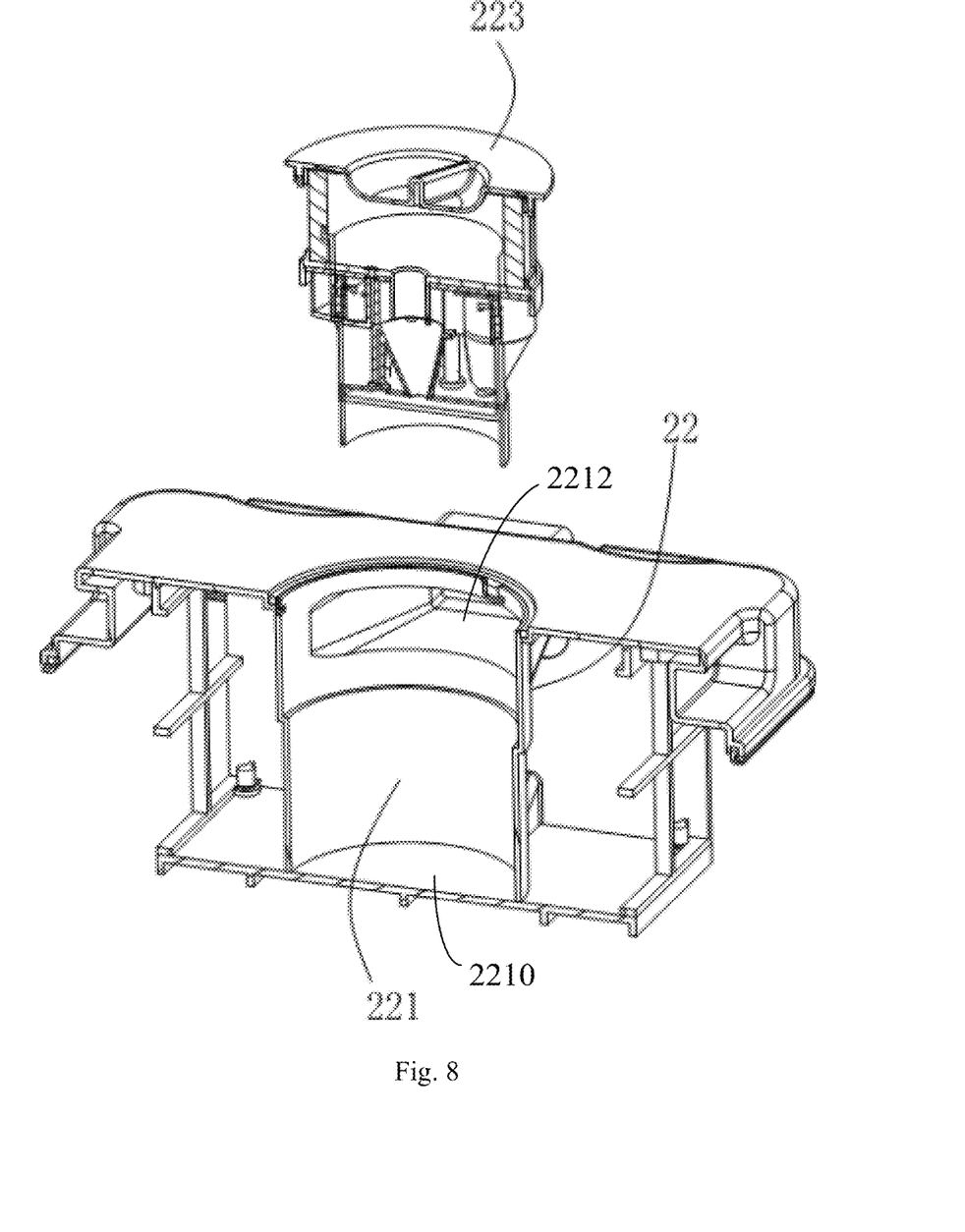
FIG. 8 is a schematic explosive view of a separating device of the dirt collecting box assembly provided by the embodiment of the present disclosure.

Referring to FIG. 7 and FIG. 8, further, the air duct structure 22 defines a cyclone cavity 221 between both ends thereof, and the separating device 20 further includes a cyclone structure 223, and the cyclone structure 223 is installed in the cyclone cavity 221. The cyclone structure 223 may guide the airflow entering from the air inlet side 222 to flow to the fan assembly 30 after rotational and centrifugal movement.

In this embodiment, the cyclone cavity 221 has a closed end 2210 facing the bottom of the dirt collecting box 10 and an open end 2212 arranged opposite to the closed end 2210. The cyclone structure 223 is detachably installed in the cyclone cavity 221 through the open end 2212. The open end 2212 may penetrate through the box cover 14, such that the cyclone structure 223 may be taken out from the surface of the box cover 14 for maintenance. The cyclone structure 223 defines an air inlet channel 224 and an exhaust channel 225, and includes a plurality of cyclone taper pipes 226 communicated between the air inlet channel 224 and the exhaust channel 225. The air inlet channel 224 is communicated with the air inlet side 222 of the air duct structure 22, and the exhaust channel 225 is communicated with the air outlet 50. The plurality of cyclone taper pipes 226 are facing towards the bottom of the cyclone cavity 221, the cyclone structure 223 defines a separating cavity 227 at the side that the cyclone taper pipes 226 face, and the exhaust channel 225 is communicated with the separating cavity 227, so as to communicate with the plurality of cyclone taper pipes 226 through the separating cavity 227. The airflow may enter the air inlet channel 224 of the cyclone structure 223 from the air inlet side 222, and then enter the plurality of cyclone taper pipes 226 for centrifugal and rotational movement, so as to fully separate the water vapor in the separating cavity 227 and achieve the dehumidification effect. The airflow passing through the plurality of cyclone taper pipes 226 continues to flow to the air outlet 50 through the exhaust channel 225 to pass through the fan assembly 30. Wherein, the number of cyclone taper pipes 226 may be one or two or more than two, which is not limited here, and those of ordinary skill in the art may set the number on their own according to actual needs.

Figure 9:
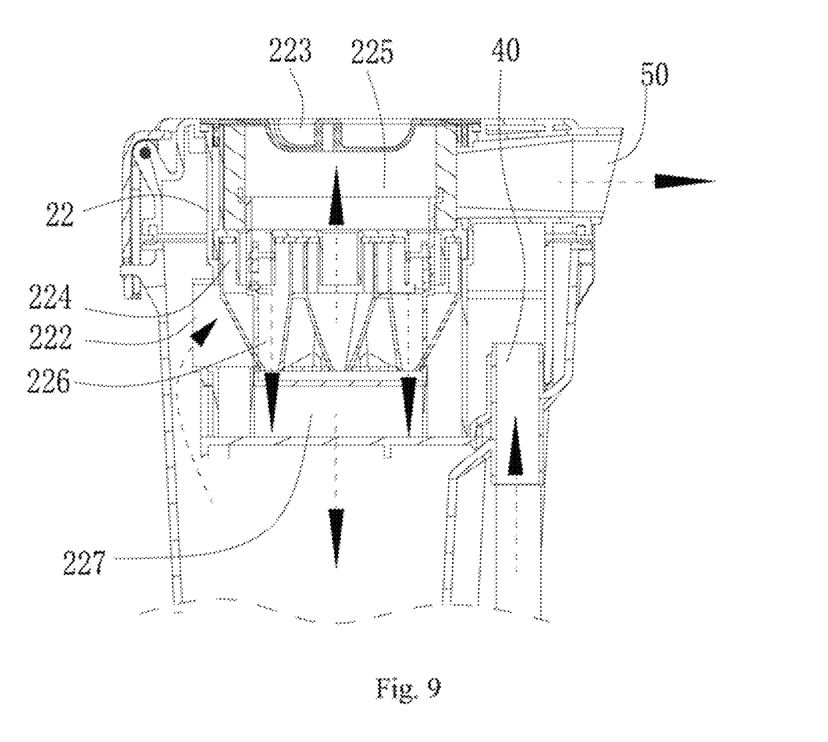
FIG. 9 is an enlarged schematic view of a partial structure in FIG. 3.

Referring to FIG. 9, further, the box cover 14 defines the air outlet 50 communicating the fan assembly 30, one end of the air duct structure 22 is communicated with the air outlet 50, and another end of the air duct structure 22 away from the air outlet 50 is provided with the air inlet side 222, and the position of the air inlet side 222 and the position of the air outlet 50 form a height difference in the height direction of the dirt collecting box 10. Wherein, by setting the air outlet 50 at a relatively higher position and the air inlet side 222 at a relatively lower position, it is beneficial for increasing the flow path length of the airflow from the air inlet side 222 to the air outlet 50, slowing down the flow rate of the airflow, and reducing noise and achieving the dehumidification effect.

Figure 10:
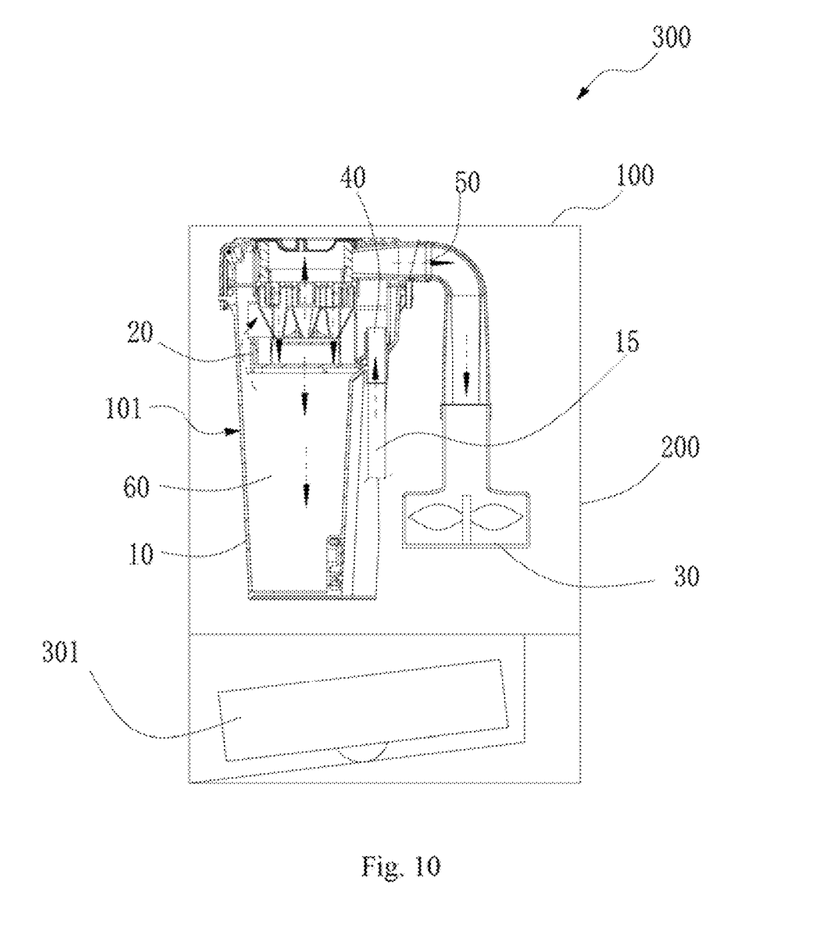
FIG. 10 is a schematic structural view of a cleaning system provided by an embodiment of the present disclosure.

Referring to FIG. 10, an embodiment of the present disclosure further provides a cleaning system 300, and the cleaning system 300 includes a cleaning equipment 301 and the maintenance station 100 as described above.

Regarding to the cleaning equipment 301 provided by the embodiment of the present disclosure, it shall be appreciated that, the cleaning equipment 301 may be a cleaning robot. For example, the cleaning equipment 301 may be any of a sweeping robot, a sweeping and mopping all-in-one robot, a washing robot, a mopping robot and the like, and the cleaning equipment 301 may also be a hand-held cleaning equipment 301. For example, the cleaning equipment 301 may be any of a hand-held mopping machine, a hand-held washing machine, a hand-held window cleaner and the like.

For the case where the cleaning equipment 301 is a cleaning robot, the cleaning equipment 301 may be designed to autonomously plan a path on the ground, or may be designed to move on the ground in response to a remote control commands. The cleaning equipment 301 may navigate through one or a combination of more of gyroscopes, accelerometers, cameras, GPS positioning and/or laser radar. For example, the cleaning equipment 301 may be provided with a laser radar protruding from the top surface thereof, scan the surrounding environment by the laser radar to collect obstacle data, build an environment map according to the obstacle data, and perform real-time positioning according to the environment map to make it convenient to plan the cleaning path.

The cleaning equipment 301 may autonomously navigate to the maintenance station 100, such that the cleaning equipment 301 docks at the maintenance station 100 to facilitate the maintenance station 100 to maintain the cleaning equipment 301.

For the case where the cleaning equipment 301 is the hand-held cleaning equipment 301, the user may manually place the cleaning equipment 301 on the maintenance station 100 for maintenance.

For the dirt collecting box assembly 101, the maintenance station 100 and the cleaning system 300, the separating device 20 is installed in the cavity 60 of the dirt collecting box 10 and is close to the top of the cavity 60, the separating device 20 is communicated between the dirt inlet 40 and the air outlet 50, the fan assembly 30 is pneumatically communicated with the air outlet 50, the fan assembly 30 is configured to generate negative pressure, and the fan assembly 30 may generate strong suction such that waste water enters the separating device 20 through the dirt inlet 40 under the negative pressure and enters the dirt collecting box 10 after solid-liquid separation of the separating device 20. The separating device 20 may function to separate solid trash, thus avoiding the problems of unpleasant smell and pollution caused by the mixing of solid trash and liquid in the dirt collecting box 10, and realizing the effect of the dirt collecting box assembly 101 for collecting solid trash and waste water separately. Moreover, the separating device 20 does not need to occupy the space outside the dirt collecting box 10, which facilitates the miniaturization of the maintenance station 100.

Finally, it shall be noted that the above embodiments are only used to illustrate the technical solutions of the present disclosure, but not to limit the present disclosure. Under the thought of the present disclosure, the technical features in the above embodiments or different embodiments may also be combined, the steps may be implemented in any order, and there are many other variations in different aspects of the present disclosure as described above, which are not provided in details for brevity. Although the present disclosure has been described in detail with reference to the foregoing embodiments, those of ordinary skill in the art shall appreciate that, it is still possible to modify the technical solutions recorded in the foregoing embodiments or to substitute for some of the technical features equivalently. However, these modifications or substitutions do not make the essence of the corresponding technical solutions deviate from the scope of the technical solutions of the embodiments of the present disclosure.

What is claimed is:

1. A dirt collecting box assembly, comprising a dirt collecting box and a separating device, the dirt collecting box defining a dirt inlet, an air outlet, and a cavity, the cavity communicated between the dirt inlet and the air outlet, the separating device installed in the cavity of the dirt collecting box and close to a top of the cavity, the separating device communicated between the dirt inlet and the air outlet, the air outlet configured to communicate a fan assembly, the fan assembly configured to generate negative pressure through the air outlet, such that waste water enters the separating device via the dirt inlet under the negative pressure, and enters the cavity of the dirt collecting box after solid-liquid separation of the separating device;

wherein the separating device comprises a dirt storage container, the dirt storage container is communicated with the dirt inlet, the dirt storage container comprises an air outlet side, and the dirt storage container is communicated with the cavity and the air outlet through the air outlet side;

the dirt storage container comprises two guide side plates oppositely arranged, the two guide side plates are respectively adjacent to two opposite first sidewalls of the dirt collecting box, the air outlet side is connected to a side of each of the two guide side plates, and the two guide side plates are configured to guide waste water and airflow to the air outlet side;

the separating device further comprises an air duct structure connected with the dirt storage container, one end of the air duct structure is communicated with the air outlet, and another end of the air duct structure away from the air outlet comprises an air inlet side, and the air duct structure is communicated with the cavity through the air inlet side;

the air duct structure is accommodated in the dirt storage container, the air duct structure spans between the two guide side plates in a horizontal direction, and both ends of the air duct structure respectively abut on the two guide side plates.

2. The dirt collecting box assembly of claim 1, wherein the dirt storage container comprises a sieve arranged on the air outlet side.

3. The dirt collecting box assembly of claim 2, wherein a bottom of the dirt storage container and a bottom of the dirt collecting box cooperatively define a liquid storage space therebetween, and the air outlet side and a second sidewall of the dirt collecting box are opposite to each other and arranged at an interval, such that the air outlet side and the second sidewall of the dirt collecting box cooperatively define an air outlet channel communicated with the liquid storage space.

4. The dirt collecting box assembly of claim 3, wherein an interval distance between the air outlet side and the second sidewall of the dirt collecting box meets a preset distance threshold, and the preset distance threshold is 10 mm to 50 mm.

5. The dirt collecting box assembly of claim 3, wherein the dirt storage container comprises two of the air outlet sides oppositely arranged, and the two air outlet sides are respectively adjacent to two opposite second sidewalls of the dirt collecting box to correspondingly define two of the air outlet channels, and the dirt inlet is located between the two air outlet sides.

6. The dirt collecting box assembly of claim 3, wherein the dirt storage container further comprises a guide bottom plate arranged in a horizontal direction, the guide bottom plate and a bottom of the dirt collecting box are opposite to each other and arranged at an interval, the guide bottom plate is the bottom of the dirt storage container, the liquid storage space is defined between the guide bottom plate and the bottom of the dirt collecting box, the air outlet side is connected to an edge of the guide bottom plate, and the guide bottom plate is configured to guide waste water and airflow to the air outlet side.

7. The dirt collecting box assembly of claim 3, wherein the air inlet side and the air outlet side respectively face different positions of the dirt collecting box, and the air inlet side and one of the first sidewalls of the dirt collecting box are opposite to each other and arranged at an interval, such that the air inlet side and one of the first sidewalls of the dirt collecting box cooperatively define an air inlet channel communicated with the air outlet channel.

8. The dirt collecting box assembly of claim 7, wherein a horizontal extension direction of the air outlet channel and a horizontal extension direction of the air inlet channel are arranged at an included angle therebetween.

9. The dirt collecting box assembly of claim 7, wherein each first sidewall and the second sidewall are arranged at an included angle therebetween.

10. The dirt collecting box assembly of claim 1, wherein the air duct structure defines a cyclone cavity between two ends thereof, the separating device further comprises a cyclone structure, the cyclone structure is installed in the cyclone cavity, and the cyclone structure is capable of guiding an airflow entering from the air inlet side to flow to the fan assembly after rotational and centrifugal movement.

11. The dirt collecting box assembly of claim 10, wherein the cyclone structure defines an air inlet channel and an exhaust channel, the cyclone structure comprises a plurality of cyclone taper pipes communicated between the air inlet channel and the exhaust channel, the air inlet channel is communicated with the air inlet side of the air duct structure, and the exhaust channel is communicated with the air outlet.

12. The dirt collecting box assembly of claim 11, wherein the cyclone taper pipes are facing towards a bottom of the cyclone cavity, the cyclone structure defines a separating cavity at the side that the cyclone taper pipes face, and the exhaust channel is communicated with the separating cavity.

13. The dirt collecting box assembly of claim 1, wherein the air duct structure is integrally arranged with a box cover of the dirt collecting box.

14. The dirt collecting box assembly of claim 1, wherein the dirt collecting box comprises a box body and a box cover, the box cover covers the box body, the box cover and the box body cooperatively define the cavity, the dirt storage container is connected to the box cover, the dirt storage container and the box cover cooperatively define a dirt storage cavity, the dirt storage cavity is communicated with the cavity through the air outlet side, and the air duct structure is installed in the dirt storage cavity.

15. The dirt collecting box assembly of claim 14, wherein the box cover defines the air outlet communicating the fan assembly, and the position of the air inlet side and the position of the air outlet form a height difference in a height direction of the dirt collecting box.

16. A maintenance station for maintaining a cleaning equipment, the maintenance station comprising a station body, a dirt inlet pipe, a fan assembly, and the dirt collecting box assembly of claim 1, the dirt collecting box detachably installed on the station body, the dirt inlet pipe installed on the station body and communicated with the dirt inlet, and the fan assembly installed on the station body and communicated with the air outlet.

17. A cleaning system, comprising a cleaning equipment and the maintenance station of claim 16, the maintenance station configured to maintain the cleaning equipment.

* * * * *